3,201,364
POLYPROPYLENE PLASTICIZED WITH MINERAL OIL
Ival O. Salyer, Dayton, Ohio, assignor to Monsanto
Company, a corporation of Delaware
No Drawing. Filed Aug. 26, 1960, Ser. No. 57,367
5 Claims. (Cl. 260—33.6)

This application is a continuation-in-part of my copending application, Serial No. 821,391, filed June 19, 1959.

The present invention is directed to solid polymers of propylene having improved brittleness properties at low temperature. More specifically, this invention pertains to polypropylene formulations particularly adapted to uses as low modulus films.

Solid high molecular weight crystallizable polypropylene, prepared by the low pressure process, is characterized by properties that are dependent upon both its degree of crystallinity, and its environmental temperature. Thus, depending upon its crystalline content, polypropylene may range from a rigid brittle solid to a soft flexible rubber. However, regardless of its crystalline content and room temperature flexibility, unmodified polypropylene will always be brittle at temperatures below its glass transition (about 5° C.). Although inferior to either high or low pressure polyethylene in its low temperature properties, polypropylene is greatly superior to polyethylene in resistance to high temperatures (melting point about 176° C. v. 135° C.).

It is an object of this invention to prepare polypropylene compositions having improved flexibility and toughness at both room temperature and below 0° C. while retaining a large measure of its high temperature properties.

The properties of low pressure polypropylene are to a considerable extent due to its substantially regular or stereospecific arrangement of side chain groups which permit the polymer to exist in crystalline form. If polypropylene chains have the methyl side groups occurring at random on either side of the chain the copolymer is said to be atactic and when the side groups all lie on one side of the chain the polymer is said to be isotactic. When the methyl side chain groups alternate regularly from one side to the other, in an ordered DL-steric configuration, the polymer is said to be syndiotactic. Either isotactic or syndiotactic polypropylene can be used in the practice of this invention.

Polypropylene of high isotactic content is brittle upon impact at room temperature and below. When the whole polymer contains an appreciable content of atactic material, e.g., about 10% or more, it has good toughness at room temperature, but still becomes undesirably brittle at the glass transition of the rubber phase, which is about 5° C. An introduction of controlled percentages of atactic polypropylene into the isotactic polypropylene thus does not give the desired low temperature properties, and in addition, the high temperature properties are adversely affected by increased atactic polymer content.

Representative low pressure polypropylene of relatively high isotacticity has the following properties:

Tensile properties (ASTM D-638-56T):
   Strength-yield (p.s.i.) _____ 4920
   Strength-break (p.s.i.) _____ 2980
   Percent elongation-yield _____ 14
   Percent elongation-break _____ 320
Impact strength [1] _____ 0.68
Melt index (190° C.) [2] _____ 0.98
Clash-Berg modulus data [3] (ASTM D-1043-51):
   $T_f$ modulus, 135,000 p.s.i. (° C.) _____ 42
   $T_{2000}$ modulus, 2000 p.s.i. (° C.) _____ 158
   Stifflex range _____ 116
   25° modulus (p.s.i.) _____ 205,000
Brittleness temperature (ASTM D-746-55T),
   ° C. _____ 15 to 20

[1] Determined by the Notched Izod Impact Test, values reported are (ft.-lb./in. Notch) (ASTM D-256-56).
[2] The weight of material in grams flowing through a hole 0.0825 inch in diameter and 0.315 inch in length, under a load of 2160 grams in 10 minutes (ASTM D-1238-52T).
[3] The Clash-Berg Modulus data gives information of the torsional stiffness of the polymer as related to temperature. The $T_f$ value is the temperature at which the polymer just begins to have some slight degree of flexibility; and the $T_{2000}$ is the temperature at which the material becomes very rubbery and non-load bearing. The Stifflex Range ($T_{2000}-T_f$) represents the temperature range over which the polymer is reasonably tough, i.e., high in impact strength, and at the same time rigid enough to bear some load. The value of the 25° modulus is determined to provide a further indication of the torsional modulus at approximately room temperature.

It can be seen from these data that polypropylene has exceptionally high tensile strength at room temperature, and is suitable for use at high temperatures (as indicated by its high $T_{2000}$); however, it is apparent that the polypropylene is inferior for use at low temperatures, as indicated by its $T_f$ well above room temperature, and similarly by its brittleness temperature only very slightly below room temperature. It is an object of the present invention to extend the useful temperature range downward to obtain desirable and useful characteristics at low temperatures, while still retaining the useful high temperature properties of the polypropylene. It is a further object to prepare a polymer composition having improved and more useful low temperature properties than isotactic polypropylene.

Another object of this invention is to prepare plasticized polypropylene having a broader Stifflex Range than isotactic polypropylene. Compositions containing from 50 to 95% polypropylene and 50 to 5% plasticizer are included within the broad scope of this invention, the percentages being expressed as weight percents of the formulated product.

My invention involves incorporating suitable solvating plasticizers into isotactic polypropylene to improve flexibility, processibility and elastomeric properties, and to broaden the temperature range at which articles prepared from these plasticized polypropylenes can be used.

For the preparation of the compositions of the present invention, I prefer to use a solid polymer of crystallizable propylene produced by the low pressure polymerization process. Suitable polypropylene for use in my invention will have a viscosity average molecular weight ($M_v$) of 50,000 to 600,000 or preferably 100,000 to 400,000. These values correspond to intrinsic viscosities [$\eta$] in decalin at 135° C. of 0.5–5.0 for the broad range, and intrinsic viscosities of 1.0–3.0 for the narrow range. The intrinsic viscosities of polypropylene are related to the viscosity molecular weight by the relation:

$$[\eta] = 1.00 \times 10^{-4} M_v^{0.8}$$

The method for relating the intrinsic viscosity to the molecular weight is described in an article by R. Chaing, Journal Polymer Science, 28, 235 (1958). However, molecular weights slightly higher or lower than these limits can also be useful in the practice of my invention.

Polypropylene useful in the preparation of my novel compositions is commonly known as low pressure polypropylene. Suitable polymer is prepared at comparatively mild temperatures, say at or below about 150° C. and at pressures less than 100 atmospheres. Polypropylene prepared according to the process of Italian Patents 535,712 and 549,915 or Belgian Patents 530,617, 538,782 and 558,563, disclosures of which are incorporated herein by reference, can be used in the practice of my invention.

Examples of suitable catalyst systems to prepare low pressure process polypropylene are as follows: (1) an aluminum trialkyl and a Group IV-B to Group VI-B metal halide; (2) an organic halide, a Group IV inorganic halide, and a low valence metal selected from the group consisting of alkali metals, beryllium, magnesium, zinc, cadmium, mercury, aluminum, gallium, indium, and thalium; (3) chromium oxide on silica-alumina support wherein a substantial part of the chromium is hexavalent; (4) a tri- or tetrahalide of titanium, zirconium, vanadium, or chromium, and an aluminum trialkyl or an aluminum dialkyl halide; (5) a compound of zirconium, vanadium, chromium, or titanium wherein the metal has a valence of 3 or less together with a reducing agent selected from the group consisting of Grignard reagents, alkali metal aluminum tetraalkyls, lithium hydrocarbons, tin tetraalkyls, and cadmium dialkyls; (6) a supported Group VI-B metal oxide usually pre-reduced with reducing gases at elevated temperatures or activated by treatment with metal alkyls, lithium aluminum hydride and the like.

The crystalline content of the polypropylene is commonly understood to be that part of the polymer that is insoluble in boiling normal heptane. The determination of the crystalline content is made by submitting a weighed sample of the purified, dry, whole polymer to an extraction process using n-heptane solvent. For example, the polypropylene described as having a crystalline content of 85% will have 15% of its weight extracted by refluxing normal heptane.

Highly crystalline or highly isotactic polypropylene is understood to contain about 75% to 85% isotactic polymer. This value represents the weight percent of polymer remaining after an extraction by refluxing normal heptane.

Polypropylene of medium crystallinity is considered to be that polymer having an isotactic polypropylene content of about 50% to 60%; the isotactic content of low crystallinity polypropylene is set at about 25% to 40% by definition, and at 15% to 25% for very low crystallinity polymer. These ranges are defined for convenience in discussions of the polymer. While the names are established arbitrarily herein, the actual percentage of isotactic polymer in the whole polymer has been determined by extraction, and confirmed by X-ray diffraction studies, by methods which are well known to those skilled in the art.

When highly isotactic polypropylene is plasticized according to my invention products are obtained having a combination of rigidity and toughness with an unexpected broadening of the product's Stifflex Range and with a remarkable lowering of the low temperature brittleness point for the polymer.

When medium or low crystallinity polypropylene is plasticized as further described herein, polymer compositions are obtained having excellent low modulus properties at very low temperatures. These low modulus rubbery products, having excellent flexibility and toughness, are particularly useful for the manufacture of films for uses in the transparent wrapping field for example.

Thus, it is seen, that depending upon the choice of atactic content in the starting polypropylene, products of distinctly different character and useful for different types of applications can be made.

Within the purview of this invention I have found that effective plasticization of polypropylene is obtained from certain organic liquids falling within certain specified ranges of properties. Plasticizers useful in the practice of my invention must have a solubility parameter between the ranges of 7.0 to 9.5, preferably of about 7.5 to 8.5 and a boiling point above about 200° C. Other properties of these liquids will be obvious to those skilled in the art as a result of the particular application being considered for the polypropylene composition, e.g., odor, color, toxicity, etc. will vary depending on the end use.

The phenomenon of plasticization is not completely understood. However, it is known to be related to the solvation properties of the plasticizer for the resin to be plasticized. Polypropylene in a crystalline state is considerably more resistant to ordinary solvents than is ordinary amorphous polypropylene, thus making its placticizability somewhat unpredictable from comparison with ordinary atactic polypropylene.

It has now been discovered, however, the plasticized crystalline polypropylene of desirable properties can be prepared if certain high-boiling liquids, or low-melting solids, of suitable solubility parameter are selected as plasticizers. It can be theorized that the plasticization is due to solvation of the atactic polypropylene ordinarily present in substantial amounts in isotactic polypropylene polymerizates. However, we do not intend to be bound by any theory of the mechanism, as the plasticization disclosed herein is effective regardless of what the mechanism may be.

The high boiling liquids suitable for use herein are those organic liquids having fairly high solvating power for low pressure polypropylene materials, as indicated by the solubility parameters ($\delta$) of the liquids which are in the range of about 7 to 9.5 and preferably in the range of 7.5 to 8.5. The solubility parameters referred to are values represented by the symbol $\delta$ and can be determined experimentally or by calculation. Professor Joel H. Hildebrand as early as 1916 pointed out that the order of solubility of a given solute in a series of solvents is determined by the internal pressures of the solvents. In the ensuing years he developed his solubility theory.

Hildebrand's book, "Solubility of Nonelectrolytes," gives a comprehensive treatment of the concept of cohesive energy density and proposes the square root of the cohesive energy density as a numerical value identifying the solvency behavior of specific solvents.

Since this theory was proposed by Hildebrand, various methods have been proposed for the determination of solubility parameters. P. A. Small has published a table of "Molar-Attraction Constants" in the Journal of Applied Chemistry, volume 3, page 71 (1953). Small's data permit the estimation of the solubility parameter merely from the structural formula of the compound and its density. The molar-attraction constants, G, are additive over the formula and are related to the solubility parameter by the equation $$\delta = d \Sigma G / M$$

where $\Sigma G$ is the sum for all the atoms and groupings in the molecule, $d$ is the density and $M$ the molecular weight.

The real value of Small's method lies in its application to polymers. Many methods mentioned in the literature are suitable only for volatile solvents where some physical property, such as the boiling point, can be measured. By the use of Small's equation, however, if the G values are added for the structural configuration of the repeating unit in the polymer chain, the solubility parameter can be calculated, e.g., the solubility parameter for polypropylene is thus 8.0 to 8.1.

While the high boiling liquids employed are usually purely organic in nature, it will be understood that high boiling organic materials containing substantial portions of inorganic or other material are also within the scope of this invention as, for example, organic phosphates.

As the respective solubility parameters of solvent and polymer approach each other, the enthalpy of mixing becomes smaller and the solubility of the polymer in the solvent becomes higher. A further general discussion of factors determining solubility of polymers in liquids is found in Elastomers and Plastomers, Houwink, Elsevier Pub. Co., 1950, vol. 1, Chapter 9. Compatibility between a crystallizable polypropylene and a proposed plasticizer material is dependent upon good solvation, as indicated by similarity of the solubility parameters of plasticizer and polymer. It has now been discovered that good plasticization of isotactic polypropylene having a solubility parameter of about 8.0 to 8.1 can be achieved if certain high boiling liquids having solubility parameters of 7 to 9.5, and preferably 7.5 to 8.5 are employed. Among the suitable plasticizing materials are the following which have the indicated solubility parameters according to the method of Small (reference supra):

| | Solubility parameter ($\delta$) |
|---|---|
| Dodecylphenol | 8.9 |
| Dodecylbenzene | 8.4 |
| Hexadecane | 7.8 |
| Eicosane | 7.8 |
| Diphenyl (2-ethylhexyl)phosphate | 9.3 |
| Tri(2-ethylhexyl)phosphate | 8.25 |
| n-Hexyl ether | 7.8 |
| Diisooctyl phthalate | 8.8 |
| Di(2-ethylhexyl)phthalate | 8.9 |
| Didecyl phthalate ("Flexol 10–10") | 8.9 |
| Mineral oil ("Nujol") | 8.0 |
| Di-n-octyl phthalate | 8.9 |
| Di-capryl phthalate | 8.7 |
| Turpentine | 8.1 |
| Pine oil | 8.6 |
| Tetralin | 9.5 |
| Di-(2-ethylhexyl) adipate ("Flexol A–26") | 8.34 |
| Polyethylene glycol di(2-ethylhexoate) ("Flexol 4GO") | 8.86 |
| Didecyl adipate | 8.42 |
| Isooctyl palmitate | 7.75 |

A polar group can be permitted within the plasticizer molecule providing that the hydrocarbon chain is sufficiently long to counterbalance it. Thus I can use higher molecular weight alkyl phenols wherein the alkyl group has at least 10 carbon atoms and similar alkylated aromatic alcohols such as dodecyl β-naphthol, hexadecyl benzyl alcohol, etc.

Higher molecular weight alcohols, for example, the branched alcohols prepared by the Oxo process from propylene pentamer and butylene tetramer, the highly branched hexadecanol and heptadecanol, respectively, have a solubility parameter between 7.0 and 9.5, and a boiling point above 200° C. and can be used to plasticize polypropylene according to my invention.

Normally liquid hydrocarbons, i.e., those having a melting point below room temperature, having a solubility parameter between 7.0 and 9.5, and preferably between 7.5 and 8.5, and a boiling point above 200° C., preferably above 250° C., are particularly useful in the practice of my invention. Within this grouping of suitable compounds I can use the alkyl aromatic compounds such as dodecylbenzene, tridecylbenzene, tetradecylbenzene, pentadecylbenzene, hexadecylbenzene, octadecylbenzene, eicosylbenzene, decylnaphthalene, dodecylnaphthalene, and the high boiler by-products such as those obtained in the preparation of detergent alkylates, such as dodecylbenzene high boiler.

A good polypropylene plasticizer can be obtained by the partial hydrogenation of naphthalene, e.g., tetralin, a hydrogenated naphthalene can be used in this invention. Partially halogenated polyphenyls, such as the "Aroclors" which are marketed by Monsanto Chemical Company as partially chlorinated polyphenyls, can also be used advantageously to plasticize polypropylene.

When the present invention is to be practiced in an embodiment which includes the use of mineral oil, the mineral oil should be of lubricating viscosity for best results; within the range of lubricating viscosities lies a considerable variation in actual viscosity and properties. Mineral lubricating oils are quite well-known to those skilled in the art. The mineral oil employed should be principally aliphatic hydrocarbon in character, and preferably at least 80% should have an initial boiling point of at least 300° C. corrected to atmospheric pressure. Incorporation of considerable quantities of lower molecular weight material tends to affect the physical properties of the finished product adversely. While a residual oil can be used, it is much preferred that the high molecular weight mineral oil be a distillate. The mineral oil is best obtained from petroleum sources, and the extent of paraffinicity, naphthenicity, and aromaticity will, of course, be dependent on the particular type of petroleum used as a source material. However, it should be principally aliphatic-paraffinic in nature. Where opaque or colored plastics are permissible products, the high molecular weight mineral oil employed in the invention can have some color. However, where a clear product is required, the mineral oil should undergo sufficient purification treatment to be clear and essentially free from color. In some instances such treatment will involve only distillation, whereas with other types of mineral oils it may be necessary to subject the same to rigorous chemical treatment, e.g., sulfonation or aluminum chloride treatment, and/or treatment with adsorbents, in order to obtain a clear mineral oil, which treatments will also serve to remove most or all of any aromatic hydrocarbons present.

Among high molecular weight mineral oils contemplated by the invention are those which do not yield paraffin, i.e., normally solid paraffin wax, whether or not such paraffin is contained therein, essentially comprising refined substantially paraffin-free mineral or petroleum oils. An optimum embodiment of such oil is that referred to as "liquid petrolatum." The liquid petrolatum may or may not contain paraffin, but if present, the paraffin should be present in a state whereby it is not susceptible to removal, at least under normal conditions. A suitable liquid can be defined as the oil which is obtained by the distillation of that portion of petroleum which boils between 330° C. and 390° C. and is obtained after removal of the lighter constituents of the petroleum; the distillate fraction obtained between 330° C. and 390° C. is subjected to a comprehensive purification treatment with sulfuric acid and caustic soda, followed by filtration while hot through a decolorizing carbon. On cooling said purified fraction, some solid paraffin separates out, and the liquid portion is subjected to redistillation, with that portion boiling above 360° C. being retained as the liquid petrolatum. Suitable liquid petrolatums are commercially available, for example, those sold under the tradenames 'Nujol" and Fractol." While liquid petrolatum or "mineral oil" is generally available, especially when in accordance with requirements of the U.S. Pharmacopoeia, satisfies the said details of production, it will be understood that within the scope of the present invention, a reasonable latitude as to the characteristics of the product may be contemplated. Thus, the temperature range indicated for the distillate fractions may be deviated within a reasonable scope without unduly affecting the value of the fraction for purposes of the present invention.

High boiling organic liquids of the required solubility parameter and belonging to the following classes of materials are suitable for use in the presently disclosed invention: organic esters, e.g., alkyl or other aliphatic esters of aromatic acids, particularly of dicarboxylic aromatic acids, alkyl or other aliphatic esters of halogenated aromatic carboxylic acids, alkyl or other aliphatic esters of long chain fatty acids; carbonates of hydroxybenzoic acid esters, triaryl phosphates, etc.; organic ethers, e.g., alkyl ethers of alkylated phenyl-phenols, diaryl ethers and ethers of hydroxy diphenyl; aromatic sulfonamides, e.g., such toluenesulfonamides as N-ethyltoluenesulfonamide; hydrocarbons, particularly aromatic hydrocarbons, e.g., arylaliphatic hydrocarbons, mixtures of terphenyls, polycyclic aromatic hydrocarbons, and non-volatile mineral oils having average molecular weight of 200–850; halogenated hydrocarbons, e.g., chlorinated naphthalene, chlorinated diphenyl, chlorinated polyphenyls, aryloxyalkyl chlorides, chlorinated terphenyls, etc.; natural or synthetic resins and waxes, e.g., rosins and rosin esters. It will be realized that the classes of materials disclosed above can be utilized either alone or admixed with each other or with other plasticizers disclosed herein or known to the art. For use alone the ester or ether type plasticizers, especially the ester type, are generally most suitable. Along with the ester or ether type plasticizers, the hydrocarbon or halogenated hydrocarbon plasticizers can be employed as extenders, e.g., butyl stearate with halogenated polyphenyls, and the results are often better than with any single type plasticizer alone. It will be realized that the term hydrocarbon" plasticizer is used to indicate the class contemplated and not to indicate that the presence of functional groups (such as are present in the other types disclosed) will render the plasticizer inoperative; in fact, the presence of functional groups, even other than those present in the other types of disclosed plasticizers, as part of an essentially hydrocarbon plasticizer will not render the material inoperative, and such essentially hydrocarbon materials can be considered as hydrocarbons. Moreover, it will be realized that any plasticizing materials known to the art, regardless of whether they belong to any of the foregoing classes, are suitable for use in the present invention provided that they have suitable compatibility and non-volatility as taught herein. To obtain materials having a solubility parameter within the range of 7.0 to 9.5 the hydrocarbon portion of the molecule must be large enough to balance or cancel the effects, to a large extent, of any strongly polar groups within the molecule. As a general rule it is preferred that the plasticizer be constituted of molecules considered to be poorly hydrogen-bonded.

It will be realized that the solubility parameters are just one of the means which can be used to express the required relationship between isotactic polypropylene and suitable plasticizing materials; for, other related definitive parameters are known which can also be utilized in the definition of suitable plasticizers. For example, cohesive energy density relationships derived from precipitation values can also be employed.

The precipitation values for the plasticizer materials can be obtained by determining the volume of an alcohol in milliliters required to cloud a 1% solution of polypropylene in a solvent of 50% by volume plasticizer and 50% by volume diluent (Decalin). Since this procedure is usually run at a somewhat elevated temperature, say 80° C., the alcohol to be added should have a boiling point above 80° C. Butyl Cellosolve, for example, can be used to determine precipitation values.

Since the numerical range of precipitation values will vary somewhat depending on the diluent used with the plasticizer candidate, and on the liquid precipitant added, it is advantageous to set up a series of test solutions and compare the precipitation values with a plasticizer known to be effective. For example, the following group of materials have precipitation values within a range of 15 ml. of the value for "Nujol" mineral oil and can be used to plasticize polypropylene according to my invention:

Butyl benzyl phthalate ("Santicizer 160" plasticizer)
Cresyl diphenyl phosphate ("Santicizer 140" plasticizer)
Polychlorinated polyphenyls ("Aroclor 1254")

The suitable plasticizers for use herein are also characterized by their boiling points; liquids having a boiling point of at least 200° C., preferably of at least 250° C., are suitable. It will be realized that low melting solids are also considered liquids for the purpose of the invention particularly those of melting point no greater than about 40° C.

The amount of plasticizer in the compositions of the present invention can vary somewhat, depending upon the particular plasticizer employed and the degree of plasticization desired as will be understood by those skilled in the art in view of the present disclosure. For example, amounts of plasticizers as defined herein constituting from about 5% to about 50% by weight of the plasticized polypropylene composition are suitable, and amounts from 10% to 30% by weight are preferred. The particular degree of plasticization desired is dependent upon the application in view.

The properties of the plasticized polypropylene are not only dependent on the percentage of plasticizer used but are also dependent on the percentage of crystallizable polymer in the polypropylene.

The plasticized polypropylene compositions of the instant invention can be used for the preparation of clear films similar in appearance to plasticized polyvinyl chloride films. While the plasticizer is generally considered to be a solvent for the atactic polypropylene (or that the atactic polypropylene becomes solvated), the mechanism of plasticization is not fully understood. It is believed that at least a portion of the crystalline polymer remains physically unchanged by the plasticizer action. The presence of critical amounts of crystalline polymer in the composition may be responsible for the excellent properties of my compositions. It will be, of course, understood that I do not intend to be limited in the practice of the present invention to any theory as to mode of operation. In practice, it has been found desirable to avoid the use of excess plasticizer over that needed to produce the desired low temperature properties; this excess plasticizer has the undesirable effect of unduly lowering the softening point (melting point or first order transition) of the high melting polymer.

As a further embodiment of my invention, the isotactic content of the polypropylene can be lowered to obtain polymer in the desired range of isotactic content by copolymerizing propylene with small amounts, say about 5% by weight or less, of a comonomer. Suitable comonomers can be selected from the group of olefinic hydrocarbons having the double bond in the 1-position, i.e., the α-olefins such as ethylene, butene-1, pentene-1, styrene, etc.

I have discovered that compositions for low modulus applications, e.g., transparent films for wrapping and packaging purposes, shower curtains, etc., can be prepared by blending a plasticizer according to the present invention with polypropylene having a comparatively low isotactic polymer content, say about 50% or less. When polymer having comparatively high isotactic content, say about 70% or more, as determined by n-heptane extraction, is blended with the plasticizer, the product compositions are particularly suitable for injection moldings. These moldings have unexpected high gloss properties, good heat resistance, and vastly improved low temperature impact strength and brittleness properties when compared with polypropylene per se.

My novel plasticized polypropylene compositions can be crosslinked, if desired, by incorporating into the formulation an appropriate quantity, 0.1 to 0.8% by weight, of a free radical liberating compound, e.g., dicumyl peroxide, and heating the composition to crosslink the polymer chains. The products of my invention can alternatively be treated by bombardment with high energy electrons if desired.

The plasticizer can be incorporated in the isotactic polypropylene by various procedures such as soaking, molding, milling or other mechanical means of working, mixing with the aid of a volatile solvent, adsorption with the aid of a swelling agent which can then be extracted or volatilized, or by any other means effective for incorporating the plasticizer.

In accordance with one embodiment of the invention, a mixture of polypropylene and plasticizer is prepared by milling the two materials together on conventional plastic mills, extruders, or Banbury mixers, under conditions which do not result in degradation of polypropylene but form an intimate admixture of the two materials. The resulting composition of matter is a clear, intimate compatible blend. There can also be incorporated into the resulting blend either after it has been prepared by mixing or while the intermixing of the materials is being accomplished, any of the usual fillers, pigments, antidegradants, dyes, antioxidants, stabilizers, and other materials that are customarily incorporated in plastics for various purposes.

When roll mills are used the polypropylene is generally put on the mill first and the plasticizer with any desired compounding ingredients then added. Generally a temperature of about 175° C. to about 200° C. is high enough for milling the compositions and in some instances lower temperatures are suitable. Any milling temperature up to approximately 250° C. which will give a homogeneous blend of the materials can be employed. If a Banbury mixer is employed all the components can be charged to the mixer at one time and mixed at a temperature sufficient to prepare the homogeneous blend. In some cases the necessary heat for mixing may be supplied partly or wholly by the mechanical heat generated by the intensive mixing.

In my work on these compositions containing crystallizable polypropylene and plasticizers a great many different runs have been made. Certain representative data are set forth in the following tables and examples which present certain properties of selected materials, but these are set forth for the purpose of more fully describing the present invention and should not be considered to limit the invention to the specific details shown.

*Example 1*

To a roll mill, steam heated to 180° C., was fed a mixture of 80 g. of crystalline polypropylene prepared by the low pressure process and having an isotactic content of about 30% as determined by X-ray diffraction examination, 0.1 g. purified "Santowhite" powder, 4,4'-butylidene-bis(6-tert-butyl-m-cresol) and 0.25 g. stannous stearate. To these materials on the mill, 20.0 g. of Nujol was added at a slow dropping rate. Milling was continued for 5 minutes after the addition of Nujol was completed. The uniform blend was stripped from the mill and molded at 180° C. and 5000 p.s.i. The compression molded sample was di-cut to obtain specimens for evaluation studies. The evaluation data are summarized hereinbelow in tabulated form.

*Example 2*

Following the general procedure of Example 1 a blend was prepared consisting of 80 g. of polypropylene of 30% isotactic content, 0.1 g. of "Santowhite" crystals, 4,4'-thiobis-(6-tertbutyl-m-cresol), 0.25 g. stannous stearate, 0.1 g. triphenyl phosphite, and 20.0 g. Nujol.

*Example 3*

Following the procedure outlined above a mixture was prepared containing 60.0 g. of polypropylene of approximately 25% isotatic content, 20 g. zinc oxide, 0.1 g. of purified "Santowhite" powder, 0.25 g. stannous stearate, and 20 g. Nujol.

*Example 4*

As described previously, a composition was formulated consisting of 60 g. of polypropylene of approximately 35% isotactic content, 20 g. Nujol, 20 g. zinc oxide, 0.1 g. "Santowhite" crystals, 0.25 g. stannous stearate, and 0.1 g. triphenyl phosphite.

*Example 5*

A blended formulation was prepared on a roll mill following the procedure of Example 1 consisting of 90 g. of polypropylene of approximately 30% isotactic content and 10 g. of Nujol.

Evaluation of the compositions prepared in Examples 1 through 5 gave the following physical data:

| Product Composition | 80% Polypropylene, 20% Nujol (Example 1) | 80% Polypropylene, 20% Nujol (Example 2) | 60% Polypropylene, 20% Nujol (Example 3) | 60% Polypropylene, 20% Nujol (Example 4) | 90% Polypropylene, 10% Nujol (Example 5) |
|---|---|---|---|---|---|
| Melt index, 190° C | 3.95 | 2.57 | 5.04 | 2.97 | 2.29 |
| Clash-Berg: | | | | | |
| $T_f$ | −24.0 | −24.5 | −29.0 | −24.0 | −16.0 |
| $T_{2000}$ | +12.5 | +15.0 | +14.0 | +22.0 | +35.0 |
| Stifflex Range | 36.5 | 39.5 | 43.0 | 46.5 | 51.0 |
| 25° Modulus | 1,500 | 1,700 | | 1,900 | 2,800 |
| Tensile Strength Yield/Break | 216/627 | 204/625 | 261/537 | 189/628 | —/866 |
| Tensile Elong. Yield/Break | 45/1,207 | 50/1,238 | 80/1,023 | 50/1,075 | —/1,218 |
| Zero Tensile Break (° C.) | 124.5 | 121.5 | 127.0 | 119.2 | 135 |

*Example 6*

A series of plasticized compositions was prepared following the general procedure of Example 1, in which 20% Nujol (based on the weight of the final product) was blended with crystalline polypropylene of varying isotactic content. The evaluation data show the effect of the isotactic content on the properties of the product.

CLASH-BERG DATA

| | $T_f$ (° C.) | $T_{2000}$ (° C.) | Stifflex Range | 25° Modulus |
|---|---|---|---|---|
| 80% Polypropylene of 75–85% isotactic content | −28 | 144 | 172 | 45,000 |
| 80% Polypropylene of 50–60% isotactic content | −47 | 62 | 109 | 6,200 |
| 80% Polypropylene of 25–35% isotactic content | −54 | 38 | 92 | 2,400 |
| 80% Polypropylene of 15–25% isotactic content | −53 | −5 | 48 | |

The foregoing examples illustrate certain embodiments of the instant invention. My preferred plasticized compositions contain from 50 to 95 parts of polypropylene and correspondingly from 50 to 5 parts of a plasticizer having a solubility parameter of 7.0 to 9.5, a boiling point above 200° C., said plasticizer being selected from the group consisting of alkyl aromatic hydrocarbons, partially chlorinated polyphenyls, alkylphenols, esters of dicarboxylic aromatic acids, esters of long chain fatty acids, organic phosphates, alkyl ethers of alkylated phenylphenols, aromatic sulfonamides and mineral oil.

While the invention has been described with particular reference to several preferred embodiments thereof, it will be appreciated that variations from the details given herein can be effected without departing from the invention in its broadest aspects. As has been pointed out above, the description of various procedures of polymerization, polymer blending, proportions of polymer and plasticizer, general properties of polymer compositions, and the like given herein are generally applicable to all of the plasticized polypropylene compositions coming within the broad scope of the invention.

I claim:

1. A plasticized composition comprising 50 to 95 parts of a highly stereoregular crystallizable polypropylene and correspondingly from 50 to 5 parts of mineral oil, said mineral oil being characterized by an initial boiling point above 200° C., and a solubility parameter from 7.0 to 9.5.

2. A composition of matter comprising a normally solid highly stereoregular polymer of propylene and from 5% to 50% by weight of the total composition of a mineral oil.

3. The composition of claim 2 wherein the mineral oil has a solubility parameter from 7.0 to 9.5.

4. The composition of claim 2 wherein the polymer of polypropylene has a crystallinity content between 15% and 85%, said crystallinity being determined by extraction with refluxing normal heptane.

5. A plasticized composition comprising 70 to 90 parts of a highly stereoregular polypropylene containing about 15% to about 50% of crystalline polymer and correspondingly from 30 to 10 parts of a mineral oil plasticizer, said plasticizer being further characterized by a boiling point greater than 200° C. and a solubility parameter from 7.0 to 9.5.

References Cited by the Examiner

UNITED STATES PATENTS

| | | | |
|---|---|---|---|
| 2,691,647 | 10/54 | Field et al. | 260—33.6 |
| 2,925,398 | 2/60 | Coran et al. | 260—33.6 |
| 2,940,949 | 6/60 | Mullin | 260—33.6 |
| 2,967,164 | 1/61 | Aries | 260—30.6 |
| 2,978,430 | 4/61 | Thompson et al. | 260—30.6 |
| 3,012,020 | 12/61 | Kirk et al. | 260—33.6 |

FOREIGN PATENTS

| | | |
|---|---|---|
| 538,782 | 12/55 | Belgium. |
| 563,347 | 6/58 | Belgium. |

OTHER REFERENCES

Raff et al., Polyethylene, High Polymers (volume XI), Interscience Publishers, Inc., New York (1956), pages 156 and 308.

MORRIS LIEBMAN, *Primary Examiner.*

DANIEL ARNOLD, LEON J. BERCOVITZ, *Examiners.*